Oct. 24, 1967           E. I. BETENSKY           3,348,896
MODIFIED GAUSS TYPE OF OPTICAL OBJECTIVE
FOR USE IN ULTRAVIOLET LIGHT
Filed July 9, 1964
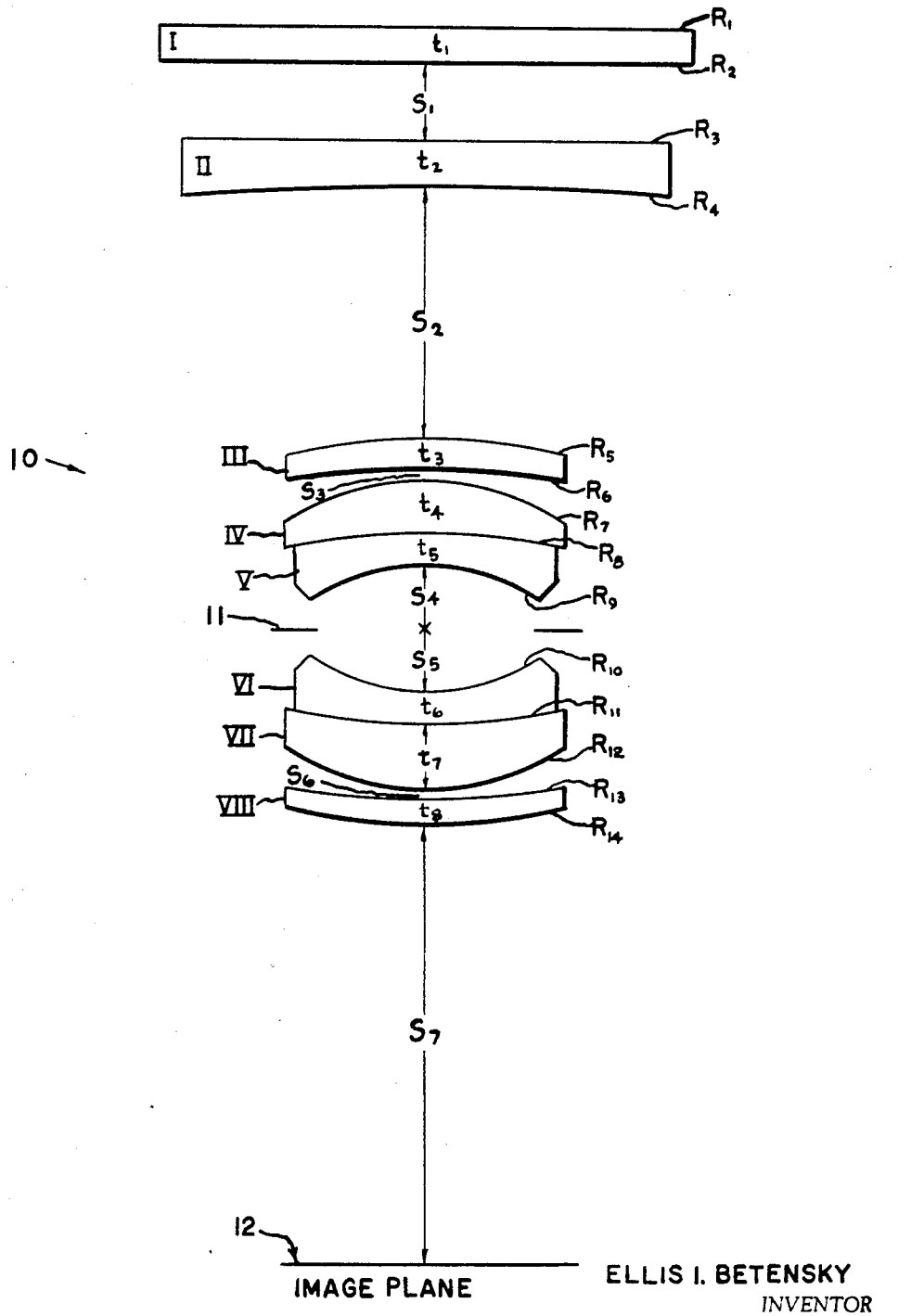
ELLIS I. BETENSKY
*INVENTOR*
BY Frank C. Parker
*ATTORNEY*

3,348,896
MODIFIED GAUSS TYPE OF OPTICAL OBJECTIVE FOR USE IN ULTRAVIOLET LIGHT
Ellis I. Betensky, Webster, N.Y., assignor to Bausch & Lomb Incorporated, Rochester, N.Y., a corporation of New York
Filed July 9, 1964, Ser. No. 381,325
2 Claims. (Cl. 350—2)

ABSTRACT OF THE DISCLOSURE

A Gauss type of optical projection objective having a relative aperture of $f/4.5$ and having in combination an aspheric aberration correcting plate, said objective being used to form an image of a picture appearing on a cathode ray tube or the like and projecting the image onto a flat screen at low magnification, said image being very flat throughout a field angle of at least 10 degrees and being well corrected for chromatic and monochromatic aberrations produced by said objective using radiation in the wavelength range from 3500 A. to 4200 A.

---

The present invention relates to a modified Gauss type of optical objective of $f/4.5$ relative aperture and more particularly relates to improvements therein.

It is an object of the present invention to provide an optical objective for projecting the information appearing on a cathode ray tube or the like onto a flat image receiving surface at a magnification of about 2.2 to 1.0 and particularly provides distortion compensation for the image to correct for the distortion characteristic of the cathode ray tube.

It is a further object to provide such a projection objective which is so corrected with regard to chromatic and monochromatic aberrations that a high grade image is formed using the maximum quantity of emitted ultraviolet radiation in the wavelength range of 3500 A. to 4200 A., the field produced by said objective being very flat within a total field angle as large as 10 degrees, the objective having a relative aperture as great as $f/4.5$ at infinity.

Further objects and advantages are to be found in the combination and arrangement of parts and in the details of construction as set forth in the specification herebelow taken in connection with the accompanying drawing wherein the single figure represents in an optical diagram a preferred form of the present invention.

One of the prime requirements in a projection objective which is used for such service as the projection onto a flat screen of information appearing on a cathode ray or television tube is the need of high grade resolution in the image produced thereby. Since cathode ray tubes involve the use of suitable phosphors to visualize such information, the projection objective must be corrected with respect to the wavelength range emitted by the tube to obtain maximum light transmission and additionally must be well corrected for all monochromatic aberration, particularly image distortion.

The Gauss type objective is represented generally by the numeral 10 in the drawing and comprises a pair of negative meniscus doublet lens members which are optically aligned between a pair of positive meniscus singlet lens members on front and rear side of a central diaphragm 11 with respect to which all of the lens surfaces are concave. Preceding the above-described lens group is a distortion correcting plate and a face plate which are air spaced from each other and from said lens group.

Identification of the aforementioned optical parts is as follows: The face plate I, the distortion correcting or aspheric plate II, the front positive singlet meniscus lens member III, the front positive meniscus lens element IV of said front doublet lens member, the rear negative meniscus lens element V of the front doublet lens member cemented to lens element IV, the diaphragm 11, the front negative meniscus lens element VI of the rear lens member, the rear negative lens element VII cemented to lens element VI, and the singlet positive meniscus lens member VII.

The successive axial thicknesses of the above-recited optical parts I to VIII numbering from the front are identified $t_1$ to $t_8$ respectively and the successive air spaces are identified as follows: $S_1$ between plates I and II, $S_2$ between plate II and member III, $S_3$ between lenses III and IV, air spaces $S_4$ and $S_5$ lying between lens V and diaphragm 11 and between lens VI and diaphragm 11 respectively, $S_6$ lying between lenses VII and VIII, and $S_7$ lying between singlet lens VIII and the image plane 12.

As aforementioned, the face plate I is a part of the cathode ray tube, not shown, and must be considered when correcting the objective, and the aspheric distortion correcting plate II is provided to remove all residual distortion in the image within a field of about 10° at a relative aperture as large as $f/4.5$ for infinity entrant rays. As far as the optical effect is concerned, it is immaterial whether the aspheric surface on the corrector plate II faces toward the face plate I or away from it as shown in the drawing.

In addition to distortion correction, the objective 10 is well corrected chromatically and is filmed or coated on its air-glass surfaces for the maximum transmission of light in the wavelength range of 3500 A. to 4200 A. which is well suited for a P-16 phosphor coating on a cathode ray tube. The constructional data given in the table herebelow for the objective 10 is so chosen and computed as to provide a near optimum correction for chromatic and spherical aberration, coma, astigmatism and field flatness with a maximum field of 10° and a relative aperture of $f/4.5$ as aforesaid, the equivalent focal length of the front doublet lens member being substantially .885 times the equivalent focal length of the rear doublet lens member.

In said table of constructional data, the equivalent focal lengths of the optical parts I to VIII are designated $F_I$ to $F_{VIII}$ and the minus (−) sign used therewith denotes negative focal length, the values thereof being given herebelow in terms of F which is the equivalent focal length of the entire objective 10.

$$F_I = \infty$$

$$F_{II} = \text{substantially } \infty$$

$$1.081F < F_{III} < 1.193F$$

$$.611F < F_{IV} < .675F$$

$$.430F < -F_V < .474F$$

$$.392F < -F_{VI} < .434F$$

$$.544F < F_{VII} < .590F$$

$$1.071F < F_{VIII} < 1.183F$$

Further, the values of the optical data of the optical parts I to VIII are given as aforesaid in the table herebelow wherein the successive optical surfaces of said parts are identified $R_1$ to $-R_{14}$, the minus (—) sign used with the symbols denoting surfaces which are concave toward entrant light on the object side of the objective, $t_1$ to $t_8$ and $S_1$ to $S_7$ have the same meanings as above described.

$R_1$ = Plano
$R_2$ = Plano
$R_3$ = Plano
$R_4$ = Aspheric surface defined by $X = -.00000047 Y^4$ where X represents the sagittal coordinate and Y represents the tangential coordinate $.5150F < R_5 < .5690F$
$4.6400F < R_6 < 4.1200F$
$.1881F < R_7 < .2079F$
$.4020F < R_8 < .4444F$
$.1551F < R_9 < .1713F$
$.1625F < -R_{10} < .1795F$
$.5290F < -R_{11} < .5850F$
$.1926F < -R_{12} < .2128F$
$5.1100F < -R_{13} < 5.1100F$
$5.1500F < -R_{14} < 5.6900F$
$.02550F < t_1 < .02818F$
$.04020F < t_2 < .04440F$
$.02607F < t_3 < .02881F$
$.05110F < t_4 < .05630F$
$.02321F < t_5 < .02565F$
$.02321F < t_6 < .02565F$
$.05580F < t_7 < .06160F$
$.02122F < t_8 < .02344F$
$.06230F < S_1 < .06870F$
$2.68000F < S_2 < 2.96000F$
$.000482F < S_3 < .000532F$
$.12770F < S_4 < .14110F$
$.12770F < S_5 < .14110F$
$.000402F < S_6 < .000444F$
$1.0720F < S_7 < 1.18400F$ For one successful form of the objective 10, the values for $R_1$ to $-R_{14}$, $t_1$ to $t_8$, and $S_1$ to $S_7$ are given specifically in the table of values herebelow.

$R_1$ = Plano
$R_2$ = Plano
$R_3$ = Plano
$R_4$ = Aspheric surface defined by $X = -.00000047 Y^4$ where X represents the sagittal coordinate and Y represents the tangential coordinate
$R_5 = .5420F$
$R_6 = 4.880F$
$R_7 = .1980F$
$R_8 = .4230F$
$R_9 = .1623F$
$-R_{10} = .1710F$
$-R_{11} = .5570F$
$-R_{12} = .2027F$
$-R_{13} = 5.2700F$
$-R_{14} = .5420F$
$t_1 = .02684F$
$t_2 = .04230F$
$t_3 = .02744F$
$t_4 = .05370F$
$t_5 = .02443F$
$t_6 = .02443F$
$t_7 = .05870F$
$t_8 = .02233F$
$S_1 = .06550F$
$S_2 = 2.8200F$
$S_3 = .000507F$
$S_4 = .13440F$
$S_5 = .13440F$
$S_6 = .000423F$
$S_7 = 1.1280F$ With regard to the refractive index $n_D$ for the D line of the spectrum and the corresponding Abbe number $\nu$ for the glasses from which the optical parts I to VIII are formed, the values thereof are given in the summary herebelow.

Plate I, $n_D = 1.519$

Plate II, $n_D = 1.517$, $\nu = 64.5$

Lens elements III, IV, VII and VIII, $n_D = 1.512$ to $1.522$ and $\nu = 60.0$ to $68.0$ Negative lens elements V and VI, $n_D = 1.578$ to $1.586$ and $\nu = 42.0$ to $48.0$ Ideally, the positive lens elements III, IV, VII and VIII should have a value of $n_D = 1.51718$ and $\nu = 64.01$, the negative lens elements V and VI having ideally values of $n_D = 1.58252$ and $\nu = 46.3$.

One form of the present invention is specified in the chart of numerical values given herebelow wherein the symbols have the same meaning as defined in the foregoing description, all scalar values being given in millimeters. All air-glass surfaces are coated with an optical film which permits maximum transmission of light in the wavelength range 3500 A. to 4200 A.

Equivalent Focal Length = 236.62 mm.    f/4.5    Field = 10°

| Part | Radii | Thicknesses | Spaces | $n_D$ | $\nu$ |
|---|---|---|---|---|---|
| I | $R_1$ = Plano $R_2$ = Plano | $t_1 = 6.35$ | $S_1 = 15.50$ | 1.5190 | |
| II | $R_3$ = Plano $R_4$ = See Note | $t_2 = 10.00$ | $S_2 = 663.93$ | 1.5170 | 64.5 |
| III | $R_5 = 128.15$ $R_6 = 1158.20$ | $t_3 = 6.50$ | $S_3 = 0.12$ $S_4 = 31.92$ | 1.51718 | 64.01 |
| IV | $R_7 = 46.913$ $R_8 = 100.100$ | $t_4 = 12.77$ | | 1.51718 | 64.01 |
| V | $R_9 = 38.682$ $-R_{10} = 40.513$ | $t_5 = 5.80$ | $S_5 = 31.92$ $S_6 = 0.10$ | 1.58252 | 46.3 |
| VI | $-R_{11} = 132.044$ | $t_6 = 5.80$ | | 1.58252 | 46.3 |
| VII | $-R_{12} = 48.300$ | $t_7 = 13.90$ | $S_7 = 267.22$ | 1.51718 | 64.01 |
| VIII | $-R_{13} = 1251.400$ $-R_{14} = 128.184$ | $t_8 = 5.30$ | | 1.51718 | 64.01 |

NOTE.—$R_4$ is aspheric surface defined by the mathematical expression $X = -.00000047 Y^4$ in which X represents the sagittal coordinate, and Y represents the tangential coordinate.

Although only a single form of the invention has been shown and described in specific detail, other forms are possible and changes may be made in the details thereof within the ranges specified without departing from the spirit of the invention as defined in the appended claims.

I claim:

1. An optical projection objective of the modified Gauss type for use in ultraviolet light, said objective having a relative aperture as great as f/4.5 and forming a distortion-free image at finite conjugates, said objective being well corrected for spherical and chormatic aberrations, coma, astigmatism and field curvature for light wavelengths in the range 3500 A. to 4200 A., said objective comprising the following optically aligned optical parts, a pair of doublet negative meniscus lens members which are concave toward an intervening diaphragm from which the members are spaced by axial distances which are designated respectively $S_4$ and $S_5$, said doublet members being designated V and VI, a pair of positive meniscus singlet lens members designated III and VIII which enclose said doublet members and are concave toward said diaphragm, said members III and VIII being spaced from said doublet members by axial distances designated $S_3$ and $S_6$, on the entrant side of member III an aspheric distortion corrector plate designated II is spaced at a distance $S_2$ therefrom, and spaced at an axial distance designated $S_1$ forwardly of plate II is a plano parallel plate designated I, the constructional data of said objective having values as set forth in the table of mathematical statements herebelow wherein $R_1$ to $R_{14}$ designate the radii of the successive optical surfaces on said optical parts, the minus (—) sign used therewith denoting surfaces which are concave toward entrant light, $t_1$ to $t_8$ designate the axial thicknesses of the successive optical parts I to VIII, and $S_1$ to $S_7$ represent the successive axial air spaces from plate I to said image, $R_1$=Plano
$R_2$=Plano
$R_3$=Plano
$R_4$=Aspheric surface defined by $X=-.00000047Y^4$ where X represents the sagittal coordinate and Y represents the tangential coordinate
$R_5=.542F$
$R_6=4.880F$
$R_7=.198F$
$R_8=.423F$
$R_9=.1632F$
$-R_{10}=.171F$
$-R_{11}=.557F$
$-R_{12}=.2027F$
$-R_{13}=5.270F$
$-R_{14}=.542F$
$S_1=.0655F$
$S_2=2.8200F$
$S_3=.000507F$
$S_4=.13440F$
$S_5=.13440F$
$S_6=.000423F$
$S_7=1.1280F$
$t_1=.02684F$
$t_2=.04230F$
$t_3=.02744F$
$t_4=.05370F$
$t_5=.02443F$
$t_6=.02443F$
$t_7=.05870F$
$t_8=.02233F$ the symbol F denoting the equivalent focal length of said objective, the refractive index of the glass in plate I being substantially 1.519 and being substantially 1.517 in plate II, the refractive index of the glass in lens elements III, IV, VII and VIII being substantially 1.51718 and the Abbe number thereof being substantially 64.01, and furthermore the refractive index of the glass in the lens elements V and VI being substantially 1.58252 and the Abbe number thereof being substantially 46.3, all air-glass optical surfaces being coated to transmit a maximum of light in the wavelength range 3500 A. to 4200 A.

2. An optical projection objective of the modified Gauss type for use in ultraviolet light, said objective having a relative aperture as great as f/4.5 and forming a distortion-free image at finite conjugates, said objective being very well corrected for spherical and chromatic aberrations, coma, astigmatism and field curvature for light wavelengths in the range 3500 A. to 4200 A., said objective comprising the following optically aligned optical parts, a pair of doublet negative meniscus lens members which are concave toward an intervening diaphragm from which the members are spaced by axial distances which are designated respectively $S_4$ and $S_5$, said doublet members being designated V and VI, a pair of positive meniscus singlet lens members designated III and VIII which enclose said doublet members and are concave toward said diaphragm, said members III and VIII being spaced from said doublet members by axial distances designated $S_3$ and $S_6$, on the entrant side of member III an aspheric distortion corrector plate designated II is spaced at a distance $S_2$ therefrom, and spaced at an axial distance designated $S_1$ forwardly of plate II is a plano parallel plate designated I, the constructional data for a preferred form of said objective having specific numerical values as set forth in the chart herebelow, I and VIII represent the optical parts, $R_1$ to $R_{14}$ represent the radii of the successive optical surfaces, the minus (—) sign used therewith denoting surfaces which are concave toward entrant light, $t_1$ to $t_8$ designate the successive axial thickness of glasses in the optical parts, in the optical parts $S_1$ to $S_7$ represent the successive axial air spaces from plate I to said image, and $n_D$ and $v$ represent respectively the refractive index and Abbe number of the glasses in said parts, Equivalent Focal Length=236.62 mm.   f/4.5   Field=10°

| Part | Radii | Thicknesses | Spaces | $n_d$ | $v$ |
|---|---|---|---|---|---|
| I | $R_1$=Plano | $t_1$=6.35 | $S_1$=15.50 | 1.5190 | |
| II | $R_2$=Plano | | | | |
| | $R_3$=Plano | $t_2$=10.00 | $S_2$=663.93 | 1.5170 | 64.5 |
| | $R_4$=See Note | | | | |
| III | $R_5$=128.15 | $t_3$=6.50 | $S_3$=0.12 | 1.51718 | 64.01 |
| IV | $R_6$=1158.20 | | $S_4$=31.92 | | |
| | $R_7$=46.913 | $t_4$=12.77 | | 1.51718 | 64.01 |
| | $R_8$=100.100 | $t_5$=5.80 | $S_5$=31.92 | 1.58252 | 46.3 |
| VI | $R_9$=38.682 | | $S_6$=0.10 | | |
| | $-R_{10}$=40.513 | $t_5$=5.80 | | 1.58252 | 46.3 |
| VII | $-R_{11}$=132.044 | $t_7$=13.90 | $S_7$=267.22 | 1.51718 | 64.01 |
| | $-R_{12}$=48.300 | | | | |
| VIII | $-R_{13}$=1251.400 | $t_8$=5.30 | | 1.51718 | 64.01 |
| | $-R_{14}$=128.184 | | | | |

NOTE.—$R_4$ is aspheric surface defined by the mathematical expression $X=-.00000047Y^4$ in which X represents the sagittal coordinate, and Y represents the tangential coordinate.

All scalar values given in millimeters and all air-glass surfaces are to be coated to permit maximum transmission of light in the wavelength range 3,500 A. to 4,200 A.

No references cited.

JEWELL H. PEDERSEN, *Primary Examiner.*
RONALD J. STERN, *Assistant Examiner.*

UNITED STATES PATENT OFFICE
CERTIFICATE OF CORRECTION

Patent No. 3,348,896                    October 24, 1967

Ellis I. Betensky

It is certified that error appears in the above identified patent and that said Letters Patent are hereby corrected as shown below:

Column 3, line 16, "$R_6 < 4.1200F$" should read -- $R_6 < 5.1200F$ --.

Signed and sealed this 7th day of October 1969.

(SEAL)
Attest:

Edward M. Fletcher, Jr.

Attesting Officer

WILLIAM E. SCHUYLER, JR.

Commissioner of Patents